(12) United States Patent
Lu

(10) Patent No.: US 7,840,356 B2
(45) Date of Patent: Nov. 23, 2010

(54) METHOD FOR DETERMINING RECEIVER ORIENTATIONS

(75) Inventor: Xinyou Lu, Missouri City, TX (US)

(73) Assignee: ExxonMobil Upstream Research Co., Houston, TX (US)

( * ) Notice: Subject to any disclaimer, the term of this patent is extended or adjusted under 35 U.S.C. 154(b) by 248 days.

(21) Appl. No.: 11/922,814

(22) PCT Filed: Jun. 28, 2006

(86) PCT No.: PCT/US2006/025247

§ 371 (c)(1),
(2), (4) Date: Dec. 21, 2007

(87) PCT Pub. No.: WO2007/018810

PCT Pub. Date: Feb. 15, 2007

(65) Prior Publication Data

US 2009/0171587 A1    Jul. 2, 2009

(51) Int. Cl.
*G01V 3/38*    (2006.01)

(52) U.S. Cl. .................. 702/11; 702/70; 702/191

(58) Field of Classification Search ............ 702/1, 702/2, 5–13, 14, 38, 65, 189; 324/323–377; 367/117, 106, 134, 21, 23, 15, 153, 141; 73/152.05, 152.06, 170.33, 170.29; 703/2, 703/5
See application file for complete search history.

(56) References Cited

U.S. PATENT DOCUMENTS

| | | | |
|---|---|---|---|
| 4,617,518 A | 10/1986 | Srnka | 324/365 |
| H1490 H | 9/1995 | Thompson et al. | 367/15 |
| 5,777,476 A | 7/1998 | Papadopoulos | 324/334 |
| 6,643,589 B2 * | 11/2003 | Zhang et al. | 702/7 |
| 7,126,338 B2 | 10/2006 | MacGregor et al. | 324/334 |
| 7,379,818 B2 * | 5/2008 | Rabinovich et al. | 702/6 |
| 2004/0100263 A1 * | 5/2004 | Fanini et al. | 324/339 |
| 2007/0288211 A1 * | 12/2007 | MacGregor et al. | 703/5 |
| 2008/0015782 A1 * | 1/2008 | Saltzer et al. | 702/12 |
| 2009/0133870 A1 * | 5/2009 | Pavlov et al. | 166/250.16 |

FOREIGN PATENT DOCUMENTS

WO    WO 2007/001759    1/2007

OTHER PUBLICATIONS

Gerstoft, Peter, Inversion of Seismoacoustic Data Using Genetic Algorithms and a Posteriori Probability Distributions, Jun. 11, 1993, J. Acout. Soc. Am., pp. 770-782.*

(Continued)

*Primary Examiner*—Mohamed Charioui
*Assistant Examiner*—Ricky Ngon

(57) ABSTRACT

Method for completely specifying orientation of electromagnetic receivers dropped to the ocean bottom in an electromagnetic survey. Survey data are selected, rejecting noisy data with long offsets and data where the receiver has saturated with short offsets (61). A model is developed comprising three independent receiver orientation angles completely specifying the receiver orientation in three dimensions, and an earth resistivity model including a water layer and possibly an air layer (62). Maxwell's equations, applied to the model and the selected data, are then inverted to determine the receiver orientations (63).

20 Claims, 4 Drawing Sheets

OTHER PUBLICATIONS

Aki, K. et al. (1980) "Plane Waves in Homogeneous Media and Their Reflection and Transmission at a Plane Boundary", *Quantitative Seismology Theory and Methods*, Chapter 5, pp. 123-192.

Behrens, J. P. (2005), "The Detection of Electrical Anisotropy in 35 Ma Pacific Lithosphere: Results from a Marine Controlled-Source Electromagnetic Survey and Implications for Hydration of the Upper Mantle," *Ph.D. Thesis*, University of California, San Diego.

Chave, A. D. et al. (1991) "Electrical Exploration Methods for the Seafloor," *SEG Electromagnetic Methods in Applied Geophysics*, (ed. M.N. Nambighian),v. 2, pp. 931-966.

Constable, S. et al. (1996) "Marine Controlled-Source Electromagnetic Sounding 2: The PEGASUS Experiment," *Journal of Geophysical Research*, v. 101.B3, pp. 5519-5530.

Eidesmo, T. et al. (2002) "Sea Bed Logging (SBL), A New Method for Remote and Direct Identification of Hydrocarbon Filled Layers in Deepwater Areas," *First Break*, v. 20.3, pp. 144-152.

Ellingsrud, S. et al. (2002) "Remote Sensing of Hydrocarbon Layers by Seabed Logging (SBL): Results From a Cruise Offshore Angola," *The Leading Edge*, pp. 972- 982.

Lu, et al. (1999) "Rapid Relaxation Inversion of CSAMT Data," *Geophys. J. Int.* v. 138, pp. 381-392.

MacGregor, L. et al. (2001) "Electrical Resistivity Structure of the Valu Fa Ridge, Lau Basin, From Marine Controlled-Source Electromagnetic Sounding," *Geophy. J. Int.*, v. 146, pp. 217-236.

Mittet, R. et al. (2004) "E020: Inversion of SBL data acquired in shallow waters," *EAGE 66$^{th}$ Conference & Exhibition*—Paris, France, pp. 1-4.

Strang, G. (1993) *Introduction to Linear Algebra*, Wellesley-Cambridge Press, pp. 321-333.

Yoshioka, K. et al. (2004) "Sea Bed Logging With Three-Component Electrical Receivers," *SEG Int'l Expo. And 74$^{th}$ Annual Mtg.*, Denver, Co., pp. 1-4.

EP Search Report No. 113441US, dated May 15, 2006, 2 pages.

PCT Search and Written Opinion, dated Nov. 28, 2006, 7 pages.

\* cited by examiner

METHOD FOR DETERMINING RECEIVER ORIENTATIONS

This application claims the benefit of U.S. Provisional Application No. 60/701,817 filed on Jul. 22, 2005.

FIELD OF THE INVENTION

This invention relates generally to the field of geophysical prospecting including reservoir delineation and, more particularly, to controlled-source electromagnetic surveying for geophysical applications. Specifically, the invention is a method for determining electromagnetic receiver orientations.

BACKGROUND OF THE INVENTION

The marine controlled-source electromagnetic ("CSEM") exploration method uses man-made sources to generate electromagnetic (EM) waves and deploys receivers on the seafloor to record electromagnetic signals. The recorded electromagnetic signals are analyzed to infer subsea floor structures and/or determine nature of particular structures such as reservoirs. FIG. 1 illustrates a typical deployment of CSEM equipment, with an horizontal electric dipole (HED) source 11 towed by a vessel above the water bottom 12 on which receivers 13 are placed. This technology has been applied in hydrocarbon and mineral exploration, and also in other areas such as tectonic studies and environmental and geological engineering.

At present, receivers fall freely to the seafloor and therefore their orientations are unknown. Receiver orientations are required to determine the three-dimensional EM field vectors measured at receiver locations. The measured fields are then decomposed into components in preferred directions (for example, inline, crossline, and vertical) for analysis, inversion and interpretation. Effects on the decomposed components could be significant when the receiver cannot be oriented to those preferred directions because of inaccurate receiver orientations. Therefore the determination of receiver orientations could significantly affect data interpretation. The present invention provides a technique to determine receiver orientations.

In order to completely measure three-dimensional EM fields, receivers need be equipped with three mutually-perpendicular antennas for electric fields and three mutually-perpendicular magnetic sensors for magnetic fields. Three angles are necessary and sufficient to uniquely define the receiver orientations. These three angles establish the relationships between the measurement coordinates and receiver coordinates. A number of ways can be used to define the receiver orientations in the measurement coordinates. They are equivalent and can be converted one another. One way to define the receiver orientations is using azimuth and tilts for two horizontal channels (FIG. 2). In FIG. 2, (X, Y, Z) are assumed to be the measurement coordinates with X directed to the geodetic east, Y to the geodetic north, and Z upward. (X''', Y''', Z''') are the receiver coordinates and the designed "east", "north" and vertical channels. (X', Y', Z') and (X'', Y'', Z'') are auxiliary coordinates to help transform coordinates between (X, Y, Z) and (X''', Y''', Z'''). X' is the projection of X''' on the horizontal plane XY, while Y'' is the projection of Y'''. With those setups, the receiver azimuth ($\alpha$) is defined the angle between Y and Y', the east channel tilt ($\beta$) is the angle between X' and X''', the north channel tilt ($\gamma$) is the angle between Y'' and Y'''.

At present, a number of methods are known for determining receiver orientations. One is to directly measure receiver orientations. Present direct measurement systems for marine CSEM receivers have reliability problems. Even with such a system available, an alternative method would be still necessary in some circumstances: for example, 1) when the direct measurement system is broken; 2) when the measurement system is not aligned with the directions of electrodes/magnetic sensors because of bending of long electric antennas on the seafloor.

Another method is polarization analysis, disclosed in Behrens, J. P. (2005), "The Detection of Electrical Anisotropy in 35 Ma Pacific Lithosphere: Results from a Marine Controlled-Source Electromagnetic Survey and Implications for Hydration of the Upper Mantle," Ph.D. Thesis, University of California, San Diego (2005). Also see Constable and Cox, "Marine controlled source electromagnetic sounding 2: The PEGASUS experiment," *Journal of Geophysical Research* 101, 5519-5530 (1996). The method is based on the fact that the EM field amplitude of the signal recorded by a receiver is maximized when the receiver antenna is in the direction of the transmitter (i.e. the major axis of the polarization ellipse) provided the transmitter is towed directly towards the receiver. Polarization analysis was the primary method used in early marine CSEM work to determine receiver azimuth in the subsequent data processing. The method requires at least one towline towed directly over each receiver. Receiver azimuth accuracy provided by this method is not very high. The average error in receiver azimuths is larger than 5 degrees for field data from a boat with a dynamic position system. It could be worse for a ship without a dynamic positioning system in rough weather conditions.

Behrens also proposed to use coherency and correlation in natural EM signals recorded by different receivers to determine relative azimuth. This method was developed for receivers without a directly over-towing towline to complement the polarization analysis. The method determines the relative azimuth angle between two receivers. In order to find the receiver azimuth, the method requires the azimuth of the reference receiver be known. Success in using this method is dependent on whether high quality natural signals are recorded by both receivers. Accuracy by this method is normally lower than by polarization analysis.

R. Mittet et al. used inversion to determine receiver azimuth in "E020: Inversion of SBL data acquired in shallow waters," EAGE 66$^{th}$ Conference & Exhibition—Paris, France, Jun. 7-10 (2004). This method overcomes limitations on both the polarization analysis and the method of using natural EM signals. All three of these methods, though widely used, address only the receiver azimuth, but do not disclose how to determine receiver orientations uniquely, i.e. both the azimuth and the tilts of the two horizontal channels. The reasons for neglecting the receiver's other two angles are at least three in number. (1) Data interpretation is mainly focused on (and data measurement may be limited to) the inline (meaning along the tow direction) electric component, which is normally not affected much by the tilts if the seafloor is not very steep. (2) The vertical electric component is either not measured or is not fully utilized in data interpretation. (3) No reliable and accurate method is available to determine the receiver orientations. The two tilts are normally small (<10 degrees because the seafloor is normally flat. The three reasons are obviously not completely independent of each other.

In addition to the three reasons detailed above, the extent of possible impact on CSEM results of even small receiver tilt angles may not be appreciated. Effects of receiver orientations on the three electric components were simulated in the course of the present invention, and can be seen in FIGS. 3-5. The source and receiver geometry used in the model calculations that generated these three drawings is taken from an actual field survey. The resistivity model is a layered earth model with water depth of 125 m. The towline direction is 265.57 degrees from the geodetic north, clockwise. In the modelings, the receiver (azimuth, $\alpha$ in FIG. 2) misalignment ($\delta\alpha$) with the towline (the inline direction) is 15 degrees, the inline antenna tilt ($\beta$) is up 5 degrees, and the crossline tilt ($\gamma$) is down 3 degrees. The modeling frequency is 0.25 Hz. In each of these three drawings, the solid line represents an aligned and level receiver, the circles a level receiver with $\delta\alpha=15°$, the + symbols an aligned receiver with tilts of $\beta=5°$ and $\gamma=-3°$, and the broken line a misaligned and tilted receiver. Compared with the ideal situation (a level receiver aligned with the towline, i.e. all three angles [$\delta\alpha$, $\beta$ and $\gamma$] zero), those figures show that while azimuth has much bigger effects on the two horizontal (inline and crossline) channels than do the tilt angles (especially on the cross component), the tilts have larger effects on the vertical component $E_z$. The effects can be significant, for example, about one order in magnitude for the cross and vertical components of this example (FIGS. 4 and 5). This example clearly demonstrates the importance of determining all three angles. Receiver azimuth alone cannot uniquely define the receiver orientations deployed on seafloor.

In summary, there is a need for a technique to determine receiver orientations that can be used without any limitations on transmitter and receiver geometry. The present invention satisfies this need.

SUMMARY OF THE INVENTION

In one embodiment, the invention is a computer-implemented method for determining three independent angles specifying orientation of electromagnetic receivers in a marine electromagnetic survey, comprising: (a) selecting survey data according to criteria including signal-to-noise ratio and degree of distortion; (b) creating a model representing the survey's source-receiver geometry and media for transmission of electric signal, said model comprising three receiver orientation angles, a resistivity model, and electromagnetic source (transmitter) parameters; and (c) solving Maxwell's electromagnetic field equations with the model and selected survey data as input information and said three orientation angles as unknowns, said solution being performed by iterative numerical inversion.

The invention is preferably practiced in the frequency domain in which case the survey data are transformed into the frequency domain by Fourier transform (or other method) before the selecting step above, or at least before the solving/inversion step.

BRIEF DESCRIPTION OF THE DRAWINGS

The present invention and its advantages will be better understood by referring to the following detailed description and the attached drawings in which.

The invention will be described in connection with its preferred embodiments. However, to the extent that the following description is specific to a particular embodiment or a particular use of the invention, this is intended to be illustrative only, and is not to be construed as limiting the scope of the invention. On the contrary, it is intended to cover all alternatives, modifications and equivalents that may be included within the spirit and scope of the invention, as defined by the appended claims.

DETAILED DESCRIPTION OF THE PREFERRED EMBODIMENTS

Figure 6:
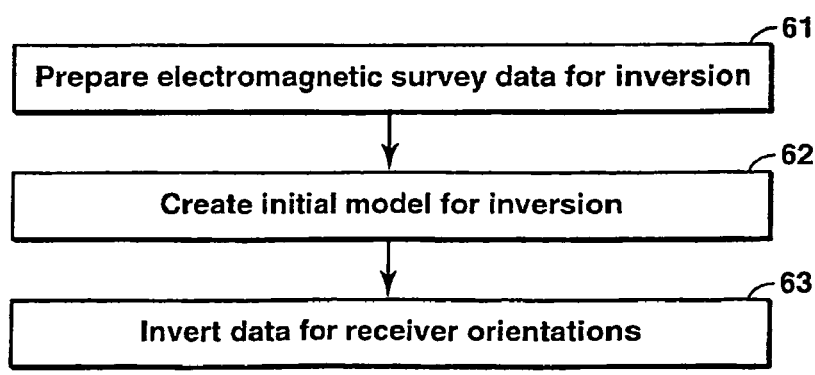
FIG. 6 is a flowchart of basic steps in one embodiment of the present inventive method.

This invention is a method for determining the orientation of an electromagnetic receiver in a marine CSEM survey by inversion of the electromagnetic field equations (Maxwell's equations). The three orientation angles are treated as inverted parameters, i.e., the unknowns to be solved for. The invention includes three basic steps, summarized in the flowchart of FIG. 6: (i) prepare data for inversion (step 61); (ii) create an initial model (step 62); and (iii) invert data for receiver orientations (step 63). As used herein, inversion means inferring x from measured data y=F(x, u, v, ... ), where finding x may be done by iterative trial and error using numerical methods such as finite difference techniques to find a solution that best fits the data by some selected criterion.

(i) Prepare Data for Inversion

Because of the well known skin depth effect, EM signals decay exponentially with distance from the source (or, transmitter) for a given frequency. The receiver cannot record high quality signals when the source is far away from the receiver because of ambient noises. When the source is too close to the receiver, the receiver is saturated because of the limited dynamic measurement range. So the measured signals are distorted. It is preferred for the invention that data are selected from such intermediate source-receiver offsets such that the source can generate signals strong enough at the receiver location to have good S/N (signal-to-noise ratio), but not too strong to saturate the receiver. In addition, accurate source and receiver geometry measurements are required for the selected data. The term "geometry" does not include angular orientation of the receivers, of course; as explained, this particular geometric feature cannot be measured with sufficient accuracy. The term does include orientations of transmitter (for example, azimuth and pitch for HED source) and coordinates of both the receiver and transmitter.

Even within a selected offset range, data may not be ideal for inversion because of effects such as source instability, individual receiver electronic characteristic, temporally changing natural EM signals, and oceanic waves. The user of the present invention may wish to manually pick data to use, possibly with the help of interactive data display software, or according to experience.

In CSEM surveying, both amplitude and phase are typically obtained for each EM field component that is measured. Either amplitude or phase data, or both, can be used for the inversion step of the present invention. For example, it could be that the phase data are assessed as having accuracy problem, in which case amplitude alone would be preferred for use in the inversion. In the most ideal situation, both amplitude and phase data of both the electric and magnetic fields, all six components, are included in the inversion. Some vertical component data are important to determine the tilts. Vertical component data are preferably about one third of the total data. Theoretically, at least 3 (independent) data points are needed to uniquely and sufficiently determine the 3 angles of the receiver, where a value of $E_X$ (either amplitude or phase) for one receiver/source position would constitute an example of a single data point. In practice, data for as many EM components as possible are preferably included because of noise and the different sensitivity of each component relative to each orientation angle. It is also preferable, but certainly not essential, to include as many frequencies and source-receiver combinations as possible. More data are more expensive to acquire, and require more computer time to process, but give more accurate results.

CSEM survey data are measured in the time domain. The present inventive method is preferably performed in the frequency domain, in which embodiments the data must be transformed to the frequency domain by Fourier transformation or other methods. For example, the frequency content of the source waveform may be known, in which case amplitude and phase information for a specific frequency can be extracted from the measured data by data fitting techniques. All such methods shall be referred to herein as transforming the data to the frequency domain. In the frequency domain, the data become complex numbers. The present inventive method may be performed using only the real part of the selected data, or only the imaginary part, or both. Equivalently, as stated above, the invention may be performed with only amplitude data, or only phase data, or both.

(ii) Create an Initial Model

An initial model is needed for inversion, which includes 3 receiver orientation angles and resistivity model. Electromagnetic source parameters such as source strength and frequency must also be included in the model as well as any needed (in the inversion step) receiver parameters such as receiver antenna length, and the field source and receiver geometry (the acquisition system must accurately record the geometry). This initial model should be created to be as realistic as possible. The inversion process (discussed below) must of course be performed by numerical methods, beginning with a first guess of the three receiver orientation angles. A good initial guess makes the inversion converge quickly and avoids the pitfall of a local minimum solution for the inversion.

Receiver azimuth determined by other methods such as the polarization analysis can be used in the initial model. The seafloor slope is normally not steep, and therefore the angles of two horizontal channel tilts can be set to be zero in the initial model. The resistivity model can be a layered model consisting of air, seawater, and sedimentary seafloor. Seawater resistivity changes with depth and often is measured for each survey area. This measured seawater resistivity column should be used in the initial model if available. Otherwise, the seawater resistivity column can be estimated by empirical formula; see, for example, Chave et al, *Electromagnetic Methods in Applied Geophysics*, M. Nambighian, Ed., Society of Exploration Geophysicists, Vol. 2, 932 (1991). The sedimentary seafloor can simply be a half-space, or composed of a number of layers, or a more sophisticated model with inputs from other measurements such as seismic survey.

(iii) Invert Data for Receiver Orientations

The selected data are then inverted to determine the receiver orientations. Electromagnetic signals recorded by the receiver are related to transmitter and receiver geometry (both coordinates and orientations) as well as earth resistivity structures. This relationship (i.e. forward problem) can be written as $d=F(m, r_{TX}, o_{TX}, r_{RX}, o_{RX})$, where d is a vector of measured data, m is a model of the earth's resistivity, ($r_{TX}$, $o_{TX}$, $r_{RX}$, $o_{RX}$) are transmitter and receiver coordinates and orientations, and F is known from Maxwell's equations for the EM fields and provides a means to compute d for any model m and transmitter and receiver geometry. It is well known that the earth's resistivity structures can be recovered from the CSEM measurements by using relationships provided by the above equation (Lu, et al. *Geophys. J. Int.* 138, 381-392(1999)). This process of solving the "forward" equation for certain variables that F depends on is called solving the inverse problem, or simply inversion. This invention uses the inverse process to recover receiver orientation. This inverse process can be simply written as follows: minimize object function=$\|\underline{W}d-\underline{W}\underline{G}p\|+\lambda R(m)$, where $\underline{W}$ is a weighting matrix, $\underline{G}$ is a forward operator linearized from F, p is a vector of inverted parameters which includes both a model of earth resistivity and receiver orientations, R(m) is a regularization term to mitigate the nonuniqueness of inversion, and $\lambda$ is a regularization parameter. Acceptable answers may be obtained, however, with the regularization term set equal to zero, and using a least-squares iteration scheme. The inverse problem and its solutions have been studied extensively. See, for example, R. L. Parker, *Geophysical Inverse Theory*, Princeton University Press, Princeton, N.J. (1994); W. Menke, *Geophysical Data Analysis: Discrete Inverse Theory*, Academic Press, San Diego, Calif. (1989); and A. Tarantola, *Inverse Problem Theory, Methods for Data Fitting and Model Parameter Estimation*, Elsevier, Amsterdam, The Netherlands (1987). In the course of developing the present inventive method, 1D inversion software was licensed from University of Wisconsin-Madison (Department of Civil and Environmental Engineering, Engineering School) and 3D inversion software was licensed from Sandia National Laboratory.

The receiver orientation angles are needed in order to more accurately determine the subsurface resistivity structure. Accordingly, it may be difficult to arrive at a good guess for the resistivity model in the inversion for the orientation angles. In some embodiments of the invention, the prepared data are inverted for both the receiver orientation angles and the earth's resistivity model simultaneously. In other embodiments, the inversion is for the receiver orientation angles only, in which instances the results will depend on the accuracy of the assumed resistivity model. When the resistivity model is determined using the orientation angles found by one application of the present invention, the inversion for the orientation angles may be repeated, and then the resistivity model inversion can be performed a second time. This cycle may be iterated until desired stop criteria are obtained. The inversion calculations may be performed in 1D, 2D, or 3D.

Use of this method can determine receiver orientations. This invention uses inversion to determine all three angles which are necessary to define the receiver orientations, rather than just the receiver azimuth as proposed by Mittet, et al.

EXAMPLE

Figure 1:
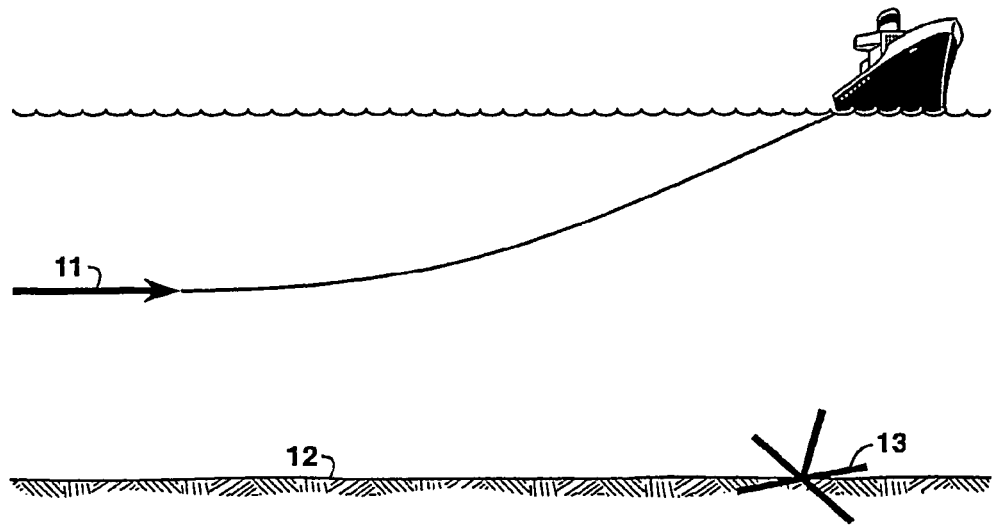
FIG. 1 illustrates a marine CSEM survey.
Figure 2:
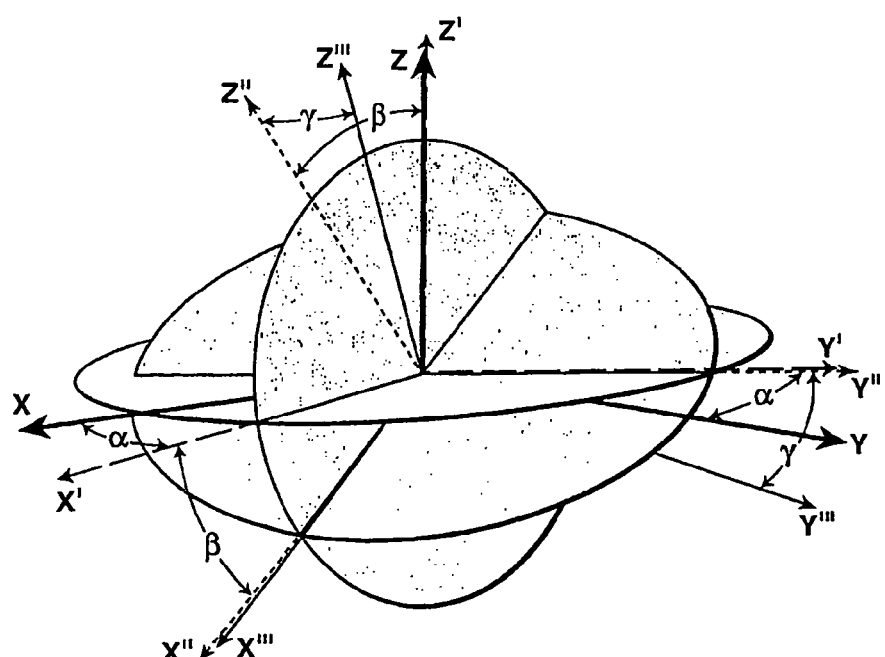
FIG. 2 defines a set of three angles relating orientation of one coordinate system to another.
Figure 3:
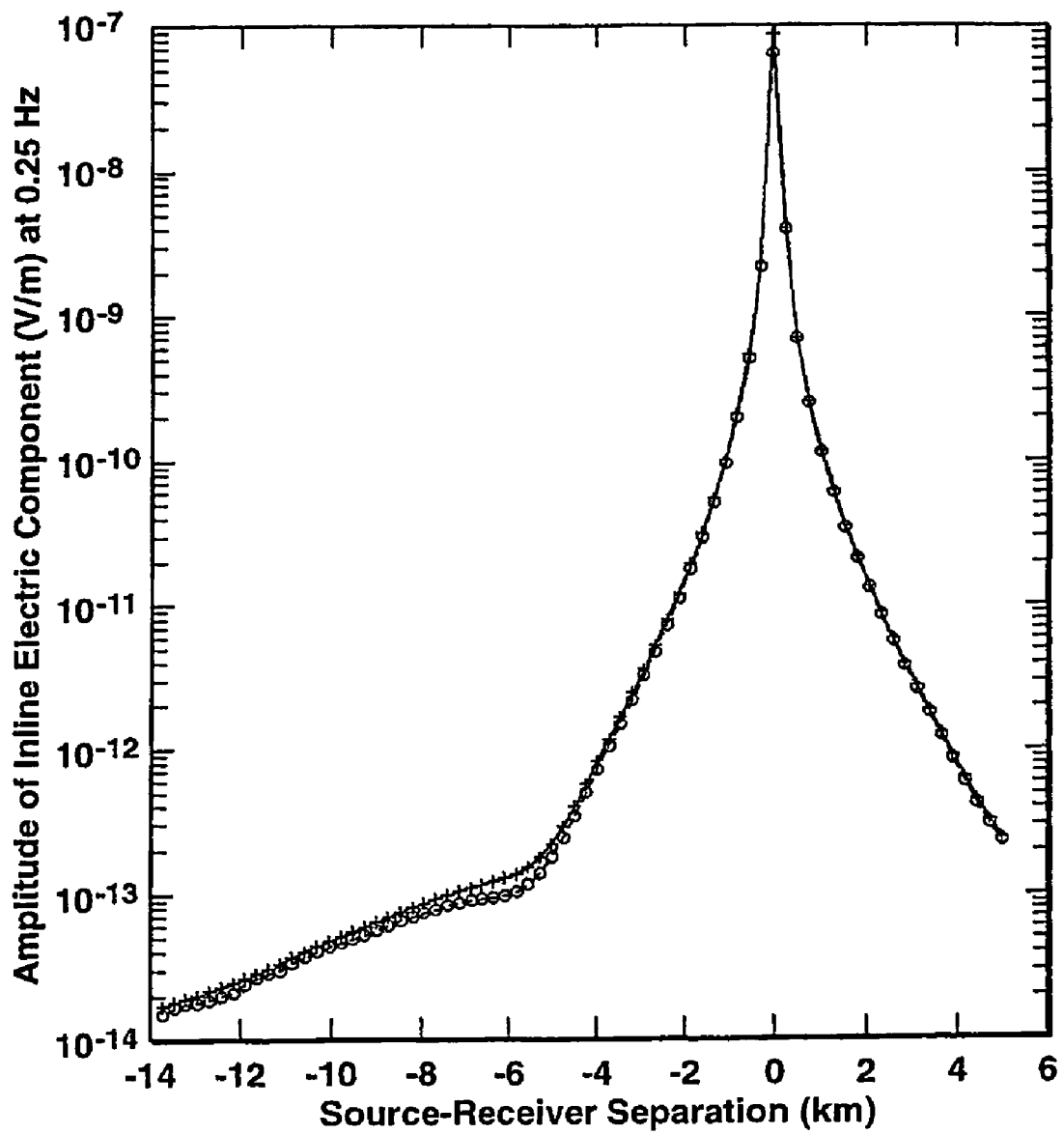
FIG. 3 shows effects of receiver orientations on the amplitude of the inline electric field component.
Figure 4:
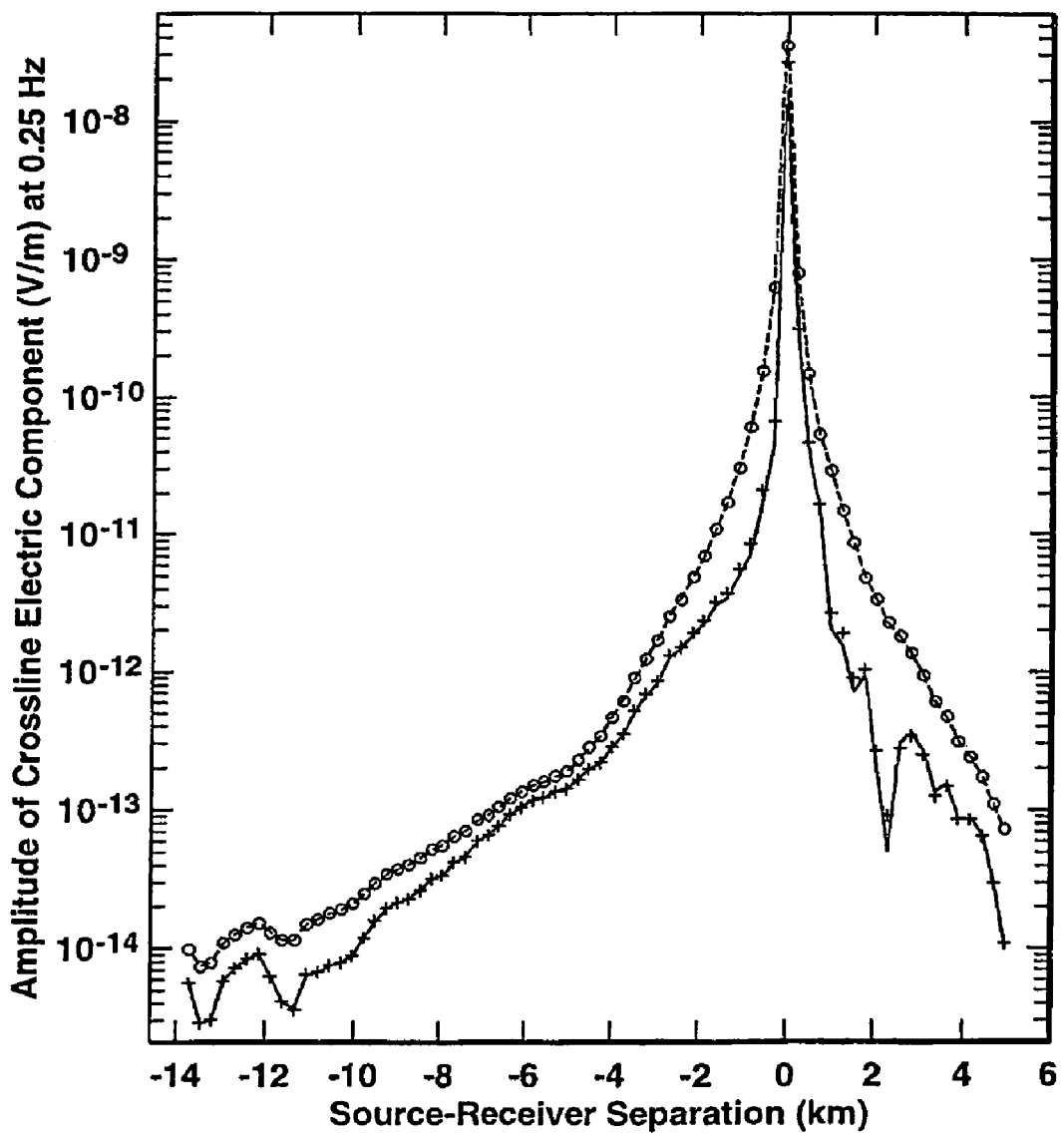
FIG. 4 shows effects of receiver orientations on the amplitude of the crossline electric field component.
Figure 5:
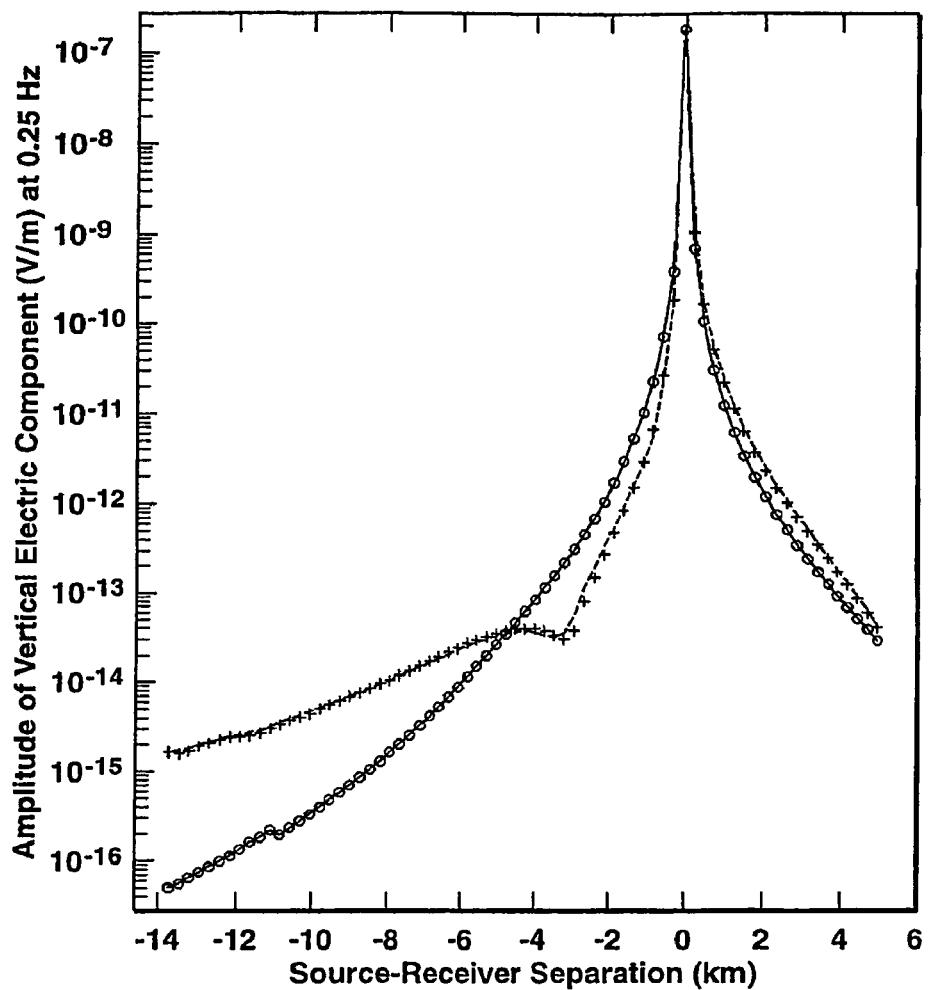
FIG. 5 shows effects of receiver orientations on the amplitude of the vertical electric field component.

A 1D model with the same source and receiver geometry as the example of FIGS. 3-5 was used to generate a synthetic data set at frequencies of 0.125, 0.25, 0.5, 1.25, and 2.0 Hz for a receiver with ($\alpha$, $\beta$, $\gamma$)=(330.0, 2.0, 4.0). This data set was then used to test how well the present inventive method could determine the receiver orientations. In this example, the inversion process was set up for simultaneously determining the receiver orientations and resistivity model. The initial resistivity model consisted of air, seawater and a uniform half-space for the sedimentary seafloor and the initial angles for receiver were (300.0, 0.0, 0.0). After applying the present inventive method, the resulting orientation angles were (α, β, γ)=(329.97, 1.95, 3.88). The recovered angles are very close to the angles used to generate the synthetic data, demonstrating the accuracy of the inventive method.

The invention claimed is:

1. A computer-implemented method for determining three independent angles specifying orientation of electromagnetic receivers in a marine electromagnetic survey, comprising:
   (a) selecting survey data according to criteria including signal-to-noise ratio and degree of distortion, wherein the survey data was recorded by the electromagnetic receivers after they were dropped from above to fall freely to the seafloor;
   (b) creating a model representing the survey's source-receiver geometry and media for transmission of electric signal, said model comprising three receiver orientation angles, a resistivity model, and electromagnetic source and receiver parameters; and
   (c) solving Maxwell's electromagnetic field equations with the model and selected survey data as input information and said three receiver orientation angles as unknowns, said solution being performed by iterative numerical inversion in which a difference between electromagnetic survey data computed from the model and the selected recorded electromagnetic survey data is minimized by varying the model, resulting in trial and error solutions for the three receiver orientation angles.

2. The method of claim 1, wherein the survey data are transformed to the frequency domain at least before the solving by inversion step.

3. The method of claim 2, wherein the transformation is by Fourier transform.

4. The method of claim 2, wherein the selected survey data is selected from a group consisting of amplitude data, phase data, and both amplitude and phase data.

5. The method of claim 2, wherein the selected survey data is selected from a group consisting of the real part of the data, the imaginary part of the data, and both real and imaginary data.

6. The method of claim 1, wherein said source-receiver geometry includes angular orientations of the electromagnetic source and coordinates of both receiver and transmitter.

7. The method of claim 1, further comprising:
   (d) revising the model to include the calculated three receiver orientation angles and repeating the inversion step with resistivity as the unknown; and
   (e) repeating step (c) with the model's resistivity values updated to the resistivity values calculated in the preceding step.

8. The method of claim 1, wherein resistivity as a function of model position is treated as an additional unknown and is solved for in the inversion step.

9. The method of claim 1, wherein the model is selected from a group consisting of a one-dimensional model, a two-dimensional model, and a three-dimensional model.

10. The method of claim 1, wherein said selected survey data includes measured values of at least one inline electromagnetic field component, at least one crossline electromagnetic field component, and at least one vertical electromagnetic field component.

11. The method of claim 1, wherein the inversion is performed by minimizing an object function.

12. The method of claim 11, wherein said object function is object function=$\|\underline{\underline{W}}d-\underline{\underline{W}}\underline{\underline{G}}p\|+\lambda R(m)$ where $\underline{\underline{W}}$ is a weighting matrix, $\underline{\underline{G}}$ is a forward operator linearized from Maxwell's equations, and p is a vector of inverted parameters which includes both a model of earth resistivity and receiver orientations, d is the selected data expressed as a vector, R(m) is a regularization term to mitigate nonuniqueness of inversion, and λ is a regularization parameter, and $\| \ldots \|$ denotes a selected norm.

13. The method of claim 12, wherein said inversion is least squares inversion, and λ=0.

14. The method of claim 1, wherein said selected survey data includes measured values of at least one inline electromagnetic field component and at least one vertical electromagnetic field component.

15. The method of claim 1, wherein survey data corresponding to source-receiver offsets greater than a pre-selected maximum value, and less than a pre-selected minimum value, are not selected for inversion, said maximum value being selected based at least in part on signal-to-noise considerations and said minimum value being selected based at least in part on receiver saturation considerations.

16. The method of claim 1, wherein said selected survey data consist of at least three independent data points.

17. The method of claim 1, wherein said resistivity model includes an earth layer and a water layer.

18. The method of claim 17, wherein said resistivity model further includes an air layer.

19. The method of claim 1, where said electromagnetic source and receiver parameters include source strength and frequency and receiver antenna length.

20. A method for producing hydrocarbons from a subterranean region, comprising
   (a) obtaining electromagnetic field data from a controlled source electromagnetic survey of the subterranean region;
   (b) selecting survey data according to criteria including signal-to-noise ratio and degree of distortion;
   (c) obtaining a model representing the survey's source-receiver geometry and media for transmission of electric signal, said model comprising three receiver orientation angles, a resistivity model, and electromagnetic source and receiver parameters;
   (d) obtaining solutions of Maxwell's electromagnetic field equations with the model and selected survey data as input information and said three receiver orientation angles as unknowns, said solution being performed by iterative numerical inversion;
   (e) using the three receiver orientation angles to resolve measured electromagnetic field data into inline, crossline and vertical components, where line refers to a line containing successive source positions; and
   (f) drilling a well into a location in said subterranean region indicated by a resistivity anomaly found in the resolved electromagnetic field data, and producing hydrocarbons from the well.

* * * * *